(12) United States Patent
van Thiel

(10) Patent No.: US 11,338,783 B2
(45) Date of Patent: May 24, 2022

(54) ELECTROPNEUMATIC TRAILER CONTROL-VALVE UNIT FOR NORTH AMERICA

(71) Applicant: WABCO GmbH, Hannover (DE)

(72) Inventor: Julian van Thiel, Grossburgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 259 days.

(21) Appl. No.: 16/571,230

(22) Filed: Sep. 16, 2019

(65) Prior Publication Data

US 2020/0086843 A1 Mar. 19, 2020

(30) Foreign Application Priority Data

Sep. 14, 2018 (DE) ........... 10 2018 122 551.2
Sep. 26, 2018 (DE) ........... 10 2018 123 750.2

(51) Int. Cl.
*B60T 13/68* (2006.01)
*B60T 8/36* (2006.01)
*B60T 8/17* (2006.01)
*B60T 13/36* (2006.01)

(52) U.S. Cl.
CPC .......... *B60T 13/683* (2013.01); *B60T 8/1701* (2013.01); *B60T 8/3605* (2013.01); *B60T 13/36* (2013.01); *B60T 2270/413* (2013.01)

(58) Field of Classification Search
CPC .... B60T 8/3605; B60T 13/385; B60T 13/581; B60T 13/683; B60T 13/686; B60T 13/74; B60T 13/743
USPC ............... 188/3 H, 3 R, 112 R; 303/123
See application file for complete search history.

(56) References Cited

U.S. PATENT DOCUMENTS

| | | | |
|---|---|---|---|
| 7,832,813 B2* | 11/2010 | Bensch | B60T 13/683 303/15 |
| 10,780,871 B2* | 9/2020 | Riley | B60T 13/683 |
| 2010/0025141 A1* | 2/2010 | Bensch | B60T 8/327 180/271 |
| 2013/0214588 A1* | 8/2013 | Kiel | B60T 15/00 303/6.01 |

(Continued)

FOREIGN PATENT DOCUMENTS

| | | |
|---|---|---|
| DE | 102011101438 A1 | 11/2012 |
| DE | 102015106150 A1 | 10/2016 |
| EP | 1968830 B1 | 3/2010 |

*Primary Examiner* — Christopher P Schwartz
(74) *Attorney, Agent, or Firm* — Leydig, Voit & Mayer, Ltd.

(57) ABSTRACT

An electropneumatic trailer control-valve unit for a vehicle includes a storage port for coupling a store of compressed air for a trailer, a brake-pressure port, and a brake-pressure pilot-control unit configured to output at least one first control pressure. The electropneumatic trailer control-valve unit further includes a brake-pressure main-valve unit configured to receive the first control pressure and to output a brake pressure at a brake-pressure port, a trailer operating-pressure port configured to receive a trailer operating pressure; and a pneumatically switched trailer protection valve with a protection-valve control port which is connected to the trailer operating-pressure port for receiving the trailer operating pressure. The trailer protection valve switches from a first switching position into a second switching position if the trailer operating pressure exceeds a predetermined first threshold value.

19 Claims, 7 Drawing Sheets

(56) References Cited

U.S. PATENT DOCUMENTS

| | | |
|---|---|---|
| 2014/0103237 A1 | 4/2014 | Herges |
| 2018/0273012 A1* | 9/2018 | Niglas ..................... B60T 7/20 |
| 2019/0152459 A1* | 5/2019 | Dieckmann ............. B60T 17/18 |
| 2020/0139952 A1* | 5/2020 | Van Thiel ............... B60T 8/323 |
| 2020/0207319 A1* | 7/2020 | Van Thiel ............... B60T 13/74 |
| 2020/0247381 A1* | 8/2020 | Van Thiel ............... B60T 13/26 |
| 2021/0171001 A1* | 6/2021 | Leinung ................ B60T 13/683 |

\* cited by examiner

ELECTROPNEUMATIC TRAILER CONTROL-VALVE UNIT FOR NORTH AMERICA

CROSS REFERENCE TO RELATED APPLICATIONS

This application claims benefit to German Patent Application Nos. DE 10 2018 122 551.2, filed Sep. 14, 2018, and DE 10 2018 123 750.2, filed Sep. 26, 2018, both of which are incorporated by reference herein.

FIELD

The invention relates to an electropneumatic trailer control-valve unit for a vehicle, to an electropneumatic trailer control module for a vehicle, to a utility vehicle with an electronically controllable pneumatic braking system with an electropneumatic trailer control-valve unit or with an electropneumatic trailer control module, and to a method for controlling an electropneumatic trailer control-valve unit.

BACKGROUND

Electropneumatic braking systems (EBS) are widespread, particularly in Europe, and serve to output a pneumatic brake pressure on the basis of an electronic braking demand. In the case of utility vehicles that have been provided for the purpose of towing a trailer, the electropneumatic braking system exhibits appropriate ports, in order to supply the trailer both with a storage pressure and with a brake pressure (control pressure). In this connection the storage pressure is made available via a so-called red coupling head, whereas the control pressure is made available via the so-called yellow coupling head (in European versions) or blue coupling head (in North American versions). In European variants, the red coupling head is generally equipped with a check valve, so that, in the event of a withdrawal of the corresponding line, the store which is provided in the towing vehicle for the trailer is not bled. In North American variants, no check valve is provided, so an additional shutting-off of the red coupling head is required.

Furthermore, a so-called trailer protection valve is generally provided which serves for protecting the air supply of the towing vehicle if the trailer is uncoupled in unforeseen manner or has a severe leak.

In practice, an interconnection of the trailer control-valve units, which are provided for the purpose of supplying the trailer with appropriate pressures, and electropneumatic parking-brake (handbrake) modules (EPH) has also proved expedient. Such a device is disclosed in DE 10 2015 106 150 A1, for instance. A parking-brake device for motor vehicles is disclosed therein having at least one bistable control-valve device, having at least one relay valve, having at least one pneumatic braking apparatus and having at least one trailer control module, wherein the relay valve is capable of being controlled by means of the control-valve device, and wherein at least the pneumatic braking apparatus is capable of being activated by means of the relay valve, wherein the trailer control module is arranged downstream of the relay valve, and wherein at least one select-high valve is arranged upstream of the trailer control module in the line branch leading to the trailer control module.

A further parking-brake device is disclosed in DE 10 2011 101 438 A1. The parking-brake device therein realizes a bistable parking-brake valve by virtue of a displaceable, spring-loaded piston with two axial piston areas which delimit two chambers. Depending on the position of the piston, the first chamber is capable of being subjected to storage pressure, to atmospheric pressure or to an intermediate pressure which is capable of being supplied to the outlet of the parking-brake valve. The second chamber is optionally capable of being connected by a valve to storage pressure or atmospheric pressure. The piston areas have been chosen in such a way that the piston is moved contrary to the force of the spring if the sum of the pressures in the two chambers exceeds a predetermined value.

An electropneumatic brake control device for controlling a parking brake of a vehicle with service brake and parking brake is disclosed in EP 1 968 830 A1. The service brake exhibits a brake pedal and brake cylinders which are actively connected to the brake pedal and capable of being actuated by compressed air for the purpose of actuating wheel brakes, wherein at least one brake cylinder takes the form of a spring-actuator brake cylinder and the spring-actuator part of the spring-actuator brake cylinder actuates the parking brake. The brake control device has been designed in such a manner that in the event of a failure of the electrical energy supply the spring-actuator part of the spring-actuator brake cylinder is capable of being permanently bled by actuation of the brake pedal. The brake control device exhibits: a compressed-air feed line, which is capable of being connected to a compressed-air storage reservoir for the purpose of actuating the spring-actuator part of the spring-actuator brake cylinder, an airflow-intensifying valve device, the inlet of which is capable of being connected to the compressed-air feed line, and the outlet of which is capable of being connected to a compressed-air line leading to the spring-actuator part of the spring-actuator brake cylinder, and which exhibits a pneumatic control input for supplying a control pressure for controlling the pressure at the outlet of the airflow-intensifying valve device, a bistable valve, capable of being actuated electrically, with an inlet which is capable of being connected to the compressed-air feed line, and the outlet of which is capable of being connected to the control input of the airflow-intensifying valve device, wherein in a parking position of the bistable valve its outlet is connected to a bleeding device, and in a drive position its outlet is connected to an inlet, an electronic control unit, to which the bistable valve is electrically connected and which controls the bistable valve, and a check valve which is arranged in the compressed-air feed line between the inlet of the airflow-intensifying valve device and a branching in the compressed-air feed line leading to the bistable valve, the check valve being open in the direction from this branching to the airflow-intensifying valve device, but blocking in the opposite direction, and said branching being directly connected to the compressed-air storage reservoir.

SUMMARY

In an embodiment, the present invention provides an electropneumatic trailer control-valve unit for a vehicle. The electropneumatic trailer control-valve unit includes a storage port for coupling a store of compressed air for a trailer, a brake-pressure port, and a brake-pressure pilot-control unit configured to output at least one first control pressure. The electropneumatic trailer control-valve unit further includes a brake-pressure main-valve unit configured to receive the first control pressure and to output a brake pressure at a brake-pressure port, a trailer operating-pressure port configured to receive a trailer operating pressure; and a pneumatically switched trailer protection valve with a protection-valve control port which is connected to the trailer operating-pressure port for receiving the trailer operating pressure. The trailer protection valve switches from a first switching position into a second switching position if the trailer operating pressure exceeds a predetermined first threshold value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
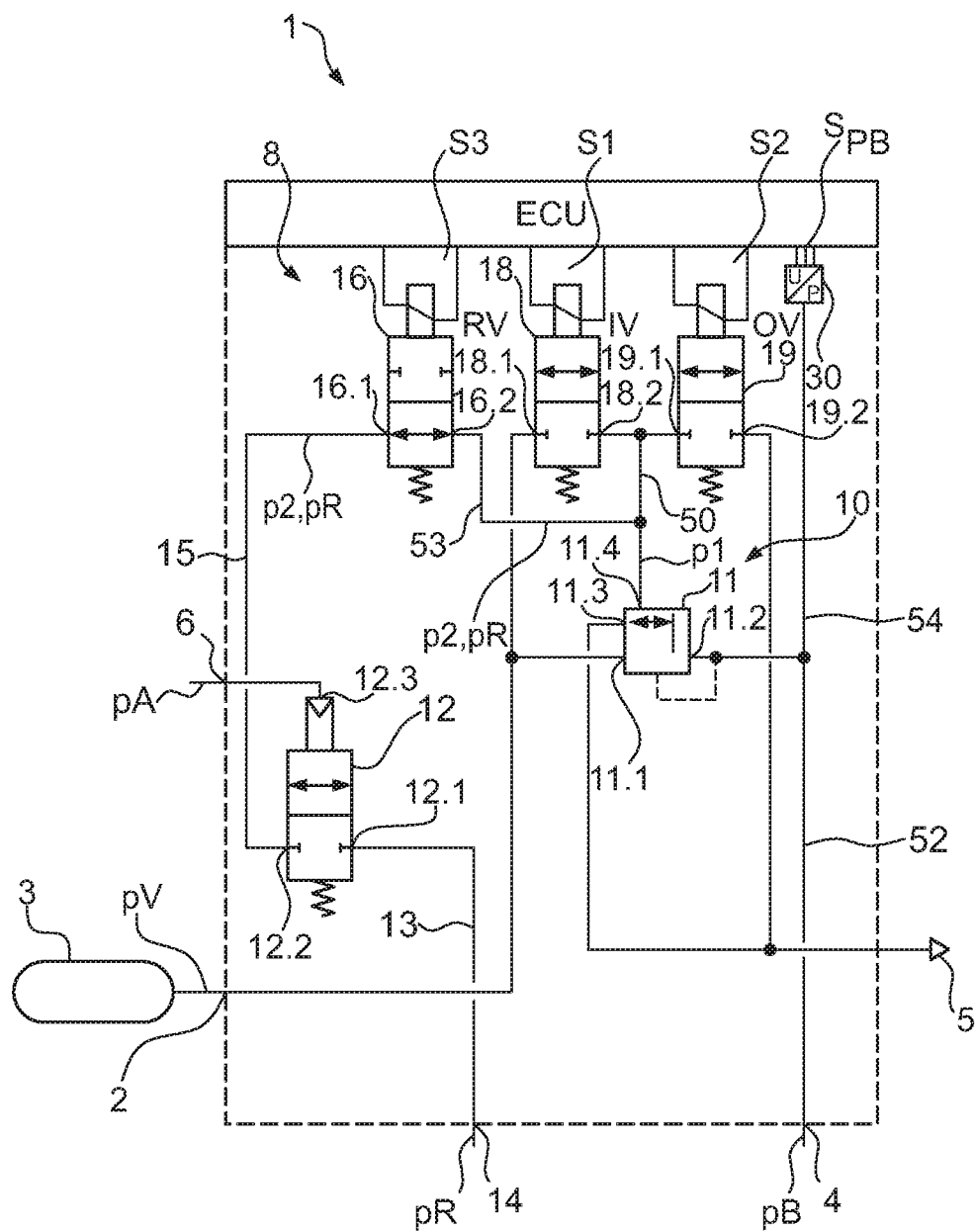
FIG. 1 illustrates a first exemplary embodiment of an electropneumatic trailer control-valve unit.

A disadvantageous aspect of conventional arrangements is that, firstly, the trailer protection valve has to switch before a brake pressure can be output by the brake-pressure pilot-control unit. Trailer protection valves are generally switched pneumatically, so the appropriate pressure required for switching firstly has to be built up. Only then does the trailer protection valve switch, and a brake pressure can be output. Also, in order to detect whether a trailer has been attached to the yellow or blue coupling head, generally a test impulse of the brake pressure is output by means of the brake-pressure pilot-control unit, and the resulting pressure at the coupling head is measured. If a pressure is being built up, this is an indication that a trailer has been attached. So this test also can only be carried out when the trailer protection valve has switched.

The invention relates to an electropneumatic trailer control-valve unit for a vehicle, in particular a utility vehicle, exhibiting a storage port for coupling a store of compressed air for a trailer, a brake-pressure port, a brake-pressure pilot-control unit for outputting at least one first control pressure, and a brake-pressure main-valve unit for receiving the first control pressure and for outputting a brake pressure at a brake-pressure port, and a trailer operating-pressure port for receiving a trailer operating pressure. The invention further relates to an electropneumatic trailer control module for a vehicle, in particular a utility vehicle, exhibiting a trailer supply unit with a trailer supply-pressure port and with a supply pilot-control unit and also with a supply main-valve unit, and an electropneumatic trailer control-valve unit, connected to the trailer supply unit, of the type mentioned above. Moreover, the invention relates to a utility vehicle with an electronically controllable pneumatic braking system with an electropneumatic trailer control-valve unit of the type mentioned above or with an electropneumatic trailer control module of the type mentioned above. Lastly, the invention relates to a method for controlling an electropneumatic trailer control-valve unit of the type mentioned above.

Embodiments of the present invention make available electropneumatic trailer control-valve units which have been adapted for the North American region, has been optimized in terms of construction space, and with which a rapid output of brake pressures has been made possible.

According to embodiments of the invention, an electropneumatic trailer control-valve unit (for a vehicle, in particular a utility vehicle, exhibiting a storage port for coupling a store of compressed air for a trailer, a brake-pressure port, a brake-pressure pilot-control unit for outputting at least one first control pressure, and a brake-pressure main-valve unit for receiving the first control pressure and for outputting a brake pressure at a brake-pressure port, and a trailer operating-pressure port for receiving a trailer operating pressure) having a pneumatically switched trailer protection valve with a protection-valve control port is provided, said port being connected to the trailer operating-pressure port for the purpose of receiving the trailer operating pressure, said trailer protection valve switching from a first switching position into a second switching position if the trailer operating pressure exceeds a predetermined first threshold value. The trailer operating pressure is preferentially a pressure that characterizes the operation of the trailer. For instance, the trailer operating pressure is a trailer supply pressure or a pressure equivalent thereto. The trailer supply pressure is that pressure which is built up in order to supply the trailer—that is to say, the pressure that is made available at the red coupling head.

By virtue of the switching of the trailer protection valve from the first switching position into the second switching position, it is detected that the trailer operating pressure has exceeded the first predetermined threshold value. This is the case when the pressure for the trailer is to be built up, for instance if the store provided for the trailer is opened or connected to the red coupling head. If no trailer has been attached, the pressure in the line that leads to a trailer supply-pressure port (to the red coupling head) does not rise, or rises only slightly, and the first threshold value may be of such a magnitude that the trailer protection valve does not switch. The first predetermined threshold value may, for instance, have been chosen in such a way that it switches at about 80% of the nominal pressure at the trailer supply-pressure port. In this way, it is possible to detect that a trailer has been attached to the red coupling head (trailer supply-pressure port).

The trailer protection valve preferentially permits the output of the brake pressure in the second switching position. That is to say, in the second switching position a brake pressure can be output at the brake-pressure port. The finding underlying this variant is that in the case of an attached trailer a control line can be filled distinctly more quickly than a storage line. That is to say, the pressure at the brake-pressure port rises in the case of an attached trailer distinctly more quickly than the pressure at a trailer supply-pressure port (red coupling head), so that in the case where no trailer has been attached distinctly less air escapes into the environment until it is established that no trailer has been attached, if for this purpose the brake-pressure port (yellow or blue coupling head) is being used. In this variant there may be provision that the first threshold value is lowered, for instance to 20%, so that the trailer protection valve already switches when a trailer operating pressure is being made available, without the pressure at the trailer supply-pressure port (red coupling head) firstly actually having to rise for this purpose. Accordingly, as soon as the trailer operating pressure (for instance, the trailer supply pressure) is being made available on the vehicle side, the trailer protection valve switches and permits the output of a brake pressure. If in the course of output of the brake pressure it is then detected that the pressure at the brake-pressure port (yellow or blue coupling head) is not rising or is not rising to a sufficient extent, on the basis of this it can be established that no trailer has been attached. By virtue of the appropriate deactivation of the trailer supply pressure, a bleeding of the store of compressed air provided for the trailer can then be prevented.

It is particularly preferred in this case that the trailer protection valve in the second switching position permits a direct output of the brake pressure or an output of a second control pressure at the brake-pressure main-valve unit for the purpose of inducing an output of the brake pressure. Both variants are preferred.

In the case of a direct output of the brake pressure, the trailer protection valve is preferentially arranged in a path between the brake-pressure main-valve unit and the brake-pressure port. That is to say, provided the trailer protection valve has not switched, no brake pressure can be output. In the aforementioned second variant, in which the trailer protection valve in the second switching position permits the output of a second control pressure at the brake-pressure main-valve unit for the purpose of inducing an output of the brake pressure, the trailer protection valve is preferentially arranged so as to be connected upstream of the brake-pressure main-valve unit, preferentially upstream of the brake-pressure pilot-control unit, or arranged parallel to the brake-pressure pilot-control unit. This makes it possible that a brake pressure is already output by means of the brake-pressure pilot-control unit, even if the trailer protection valve has not yet switched.

In another preferred embodiment, the electropneumatic trailer control-valve unit exhibits a redundancy port at which a redundancy pressure is capable of being output and which is connected to the trailer protection valve in such a manner that in the second switching position of the trailer protection valve the redundancy pressure is capable of being transmitted to the brake-pressure main-valve unit. In this way, the redundancy port is blocked if a trailer operating pressure does not obtain or does not exceed the corresponding threshold value of the trailer protection valve. By this means, the air economy of the braking system can be influenced in positive manner.

It is preferred in this case that the brake-pressure pilot-control unit exhibits an electromagnetically switchable redundancy valve, and the trailer protection valve is connected to the redundancy valve. Via the electromagnetically switchable redundancy valve, the redundancy pressure can be locked out, this being preferred in the normal mode. Ordinarily, redundancy valves of this type are switched to be currentless when a fault obtains, so that the redundancy pressure is capable of being transmitted through the redundancy valve. The redundancy valve has accordingly switched between the trailer protection valve and the brake-pressure main-valve unit, in order to lock out the redundancy pressure in the normal mode.

In a preferred variant, the trailer protection valve and the redundancy valve have been integrated into a joint combined valve. By this means, a more compact structure can be obtained overall and, where appropriate, a saving of one valve can be made.

Moreover, it is preferred that the electropneumatic trailer control-valve unit exhibits a brake-pressure sensor for registering the brake pressure. As a result of registering the brake pressure, it is possible to detect rapidly whether or not a trailer has been attached. If the brake pressure at the brake-pressure port rises in conformity with the output of the brake pressure, this is an indication that a trailer has been attached. However, if a rise does not occur, this is an indication that the brake-pressure port is connected to the environment, and correspondingly no trailer has been attached.

According to an embodiment of the invention, an electropneumatic trailer control module for a vehicle is provided, in particular a utility vehicle, with a trailer supply unit which is connected to the electropneumatic trailer control-valve unit according to one of the preferred embodiments, described above, of an electropneumatic trailer control-valve unit according to the invention. The trailer supply unit exhibits a trailer supply-pressure port and a supply pilot-control unit and also a supply main-valve unit. The trailer is supplied with trailer supply pressure via the trailer supply unit. The trailer supply-pressure port is generally designated as "red coupling head". The trailer supply unit outputs the trailer operating pressure at the trailer operating-pressure port of the electropneumatic trailer control-valve unit. The trailer operating pressure is preferentially the trailer supply pressure or a pressure equivalent thereto.

It is to be understood that the electropneumatic trailer control modules according to the invention and the electropneumatic trailer control-valve units according to the invention have subsidiary aspects that are the same as or similar to those which have been set down, in particular, in the dependent claims. To this extent, for individual further developments and also the advantages thereof, reference is made to the above description relating to the electropneumatic trailer control-valve units according to embodiments of the invention.

In a first variant of the electropneumatic trailer control module, the supply pilot-control unit has been designed to output a supply control pressure at the supply main-valve unit, and the supply main-valve unit has been designed to output a trailer supply pressure at the trailer supply-pressure port on the basis of the reception of the supply control pressure. The supply main-valve unit accordingly acts in a volume-amplifying manner. The supply control pressure is preferentially a third control pressure.

The trailer supply unit preferentially makes available either the supply control pressure or the trailer supply pressure as trailer operating pressure at the trailer operating-pressure port. The supply control pressure is equivalent to the trailer supply pressure, so that both pressures—the supply control pressure and the trailer supply pressure—can be used equally for the purpose of activating the trailer protection valve. The use of the supply control pressure may enable a more rapid response-time, in which connection the use of the trailer supply pressure enables a secure switching of the trailer protection valve by reason of the volume amplification.

The supply main-valve unit preferentially exhibits a pneumatically controllable supply main valve with a pneumatic control port which is connected to the supply pilot-control unit via a supply control-pressure line, the trailer operating-pressure port being connected to the supply control-pressure line. As an alternative, the supply main-valve unit is connected to the trailer supply-pressure port via a trailer supply-pressure line, the trailer operating-pressure port being connected to the trailer supply-pressure line. In the first variant, the supply control pressure is made available to the trailer operating-pressure port, whereas in the second variant the trailer supply pressure is made available to the trailer operating-pressure port.

In a particularly preferred embodiment, the electropneumatic trailer control module is equipped with a parking-brake unit and in this way integrated with a parking brake. Said module therefore includes a parking-brake unit, with a spring-actuator port and with a parking-brake pilot-control unit, and a parking-brake main-valve unit for outputting the spring-actuator pressure at the spring-actuator port. The spring actuators and consequently the spring-actuator port are intended to have been ventilated in the normal mode, so that the corresponding spring-actuator brakes coupled to the spring-actuator port have been released. The electropneumatic trailer control module is preferentially accommodated together with the parking-brake unit in a joint housing, so that the trailer control module and the parking-brake unit have been integrated.

The electropneumatic trailer control module preferentially exhibits an electronic control unit, at least for controlling the brake-pressure pilot-control unit. But the electronic control unit preferentially also controls the supply pilot-control unit and/or parking-brake unit.

According to embodiments of the invention, utility vehicles are provided that exhibit an electronically controllable pneumatic braking system with an electropneumatic trailer control-valve unit according to one of the preferred embodiments, described above, of an electropneumatic trailer control-valve unit, or an electropneumatic trailer control module according to one of the preferred embodiments, described above, of an electropneumatic trailer control module. For certain embodiments and the advantages thereof, reference is made to the above description, in its full scope, relating to the electropneumatic trailer control-valve units and the electropneumatic trailer control modules according to various embodiments of the invention.

According to embodiments of the invention, methods for controlling an electropneumatic trailer control-valve unit according to one of the preferred embodiments, described above, of the electropneumatic trailer control-valve unit have the following steps: receiving a trailer operating pressure at a protection-valve control port of a trailer protection valve; and switching the trailer protection valve from a first switching position into a second switching position. The methods can also preferentially include the following step: outputting a second control pressure by the trailer protection valve in the second switching position at a brake-pressure main-valve unit for the purpose of outputting a brake pressure at a brake-pressure port. The electropneumatic trailer control-valve unit according to embodiments of the invention and the methods according to embodiments of the invention have subsidiary aspects that are the same as or similar to those which have been described in the above description, in its full scope, relating to the electropneumatic trailer control-valve units according to embodiments of the invention.

In a first preferred variant, the trailer operating pressure is a supply control pressure output by a supply pilot-control unit. That is to say, in this variant a volumetric pressure is not supplied to the trailer protection valve, but rather a control pressure is supplied, namely the control pressure that is utilized for the purpose of inducing an output of the trailer supply pressure. By this means, it is possible to switch the trailer protection valve more quickly than when, as known in the prior art, the trailer supply pressure itself is utilized as control pressure for the trailer protection valve which is capable of being actuated pneumatically. Control lines can generally have smaller cross-sections and hence also smaller volumes overall than volumetric-pressure lines, and are correspondingly filled more rapidly, so that a rise in pressure occurs more rapidly. The trailer protection valve may have been arranged upstream of, parallel to, or downstream of the brake-pressure pilot-control unit.

In a preferred embodiment, the method includes the following step: outputting a brake pressure irrespective of a position of the trailer protection valve. According to this embodiment, the trailer protection valve has accordingly not been incorporated into a brake-pressure line that leads from a brake-pressure main-valve unit to a brake-pressure port. Rather, in this embodiment the trailer protection valve is arranged either parallel to the brake-pressure pilot-control unit or so as to be connected upstream of the latter, and/or preferentially arranged so as to be connected upstream of the brake-pressure main-valve unit. This embodiment has the advantage that a brake pressure can be output even if the trailer protection valve has not yet switched. For instance, it is possible and preferred to output at the brake-pressure port, by means of the brake-pressure pilot-control unit, a pressure impulse for the purpose of checking whether a trailer has been attached. By means of a pressure sensor, it is then registered whether or not a rise in pressure at the brake-pressure port can be ascertained. If no rise in pressure is ascertained, this is an indication that the brake-pressure port is open and no trailer has been attached. In the converse case, a rise in pressure is an indication that a trailer has been attached. According to this embodiment, in order to carry out this test a wait does not now have to be observed until the trailer protection valve has switched.

In a preferred embodiment of the method, the electropneumatic trailer control-valve unit exhibits a redundancy port at which a redundancy pressure is capable of being output, the redundancy port being connected to the trailer protection valve in such a manner that in the second switching position of the trailer protection valve the redundancy pressure is capable of being transmitted to the brake-pressure main-valve unit. In addition, the method may include: outputting a pressure impulse of redundancy pressure at the redundancy port. By virtue of such a pressure impulse, provided the trailer protection valve has switched, at the brake-pressure port an appropriate brake-pressure impulse is output which can then be registered by means of a sensor or such like. That is to say, by virtue of such a method it is possible to check in a straightforward manner whether a trailer has been attached. If, after output of the pressure impulse of redundancy pressure, no corresponding pressure impulse of brake pressure is measured, this is an indication that the yellow coupling head has not been connected to a trailer but is connected to the environment.

Embodiments of the invention will now be described below with reference to the drawings. The latter are not necessarily intended to represent the embodiments in a manner true to scale; rather, the drawings have been produced in schematized and/or slightly distorted form where this is useful for the purpose of elucidation. With regard to supplements of the teachings that are immediately discernible from the drawings, reference is made to the pertinent prior art. In this regard, it is to be taken into consideration that diverse modifications and amendments relating to the form and detail of an embodiment can be undertaken without departing from the general idea of the invention. The features of the invention disclosed in the description, in the drawings and also in the claims may be essential, both individually and in arbitrary combination, for the further development of the invention. In addition, all combinations of at least two of the features disclosed in the description, in the drawings and/or in the claims fall within the scope of the invention. The general idea of the invention is not restricted to the exact form or the detail of the preferred embodiments shown and described in the following, or restricted to a subject-matter that would be limited in comparison with the subject-matter claimed in the claims. In the case of specified dimensional ranges, values lying within the stated limits are also intended to have been disclosed as limiting values and are intended to be capable of being employed and claimed arbitrarily. For the sake of simplicity, the same reference symbols have been used in the following for identical or similar parts or parts having identical or similar function.

In a first exemplary embodiment, an electropneumatic trailer control-valve unit 1, which is arranged in a vehicle 200, in particular a utility vehicle 201 (cf. FIG. 7), and is part of an electronically controllable pneumatic braking system 206, exhibits a storage port 2 for coupling a store of compressed air 3 for a trailer 203. The store of compressed air 3 makes a storage pressure pV available. The electropneumatic trailer control-valve unit 1 outputs at least one brake pressure pB at a brake-pressure port 4 for the trailer 203. In European versions, the brake-pressure port 4 is also designated as "yellow coupling head"; in North American versions, as "blue coupling head" or "blue glad hand", and the brake pressure pB is the control pressure for service brakes of the trailer 203. Besides the storage port 2 for receiving the storage pressure pV, and the brake-pressure port 4 for outputting the brake pressure pB, the electropneumatic trailer control-valve unit 1 further exhibits a trailer operating-pressure port 6 for receiving a trailer operating pressure pA. The trailer operating pressure pA is made available by another unit and will be described in detail further below.

The electropneumatic trailer control-valve unit 1 further exhibits a brake-pressure pilot-control unit 8 and also a brake-pressure main-valve unit 10. The brake-pressure pilot-control unit 8 outputs a first control pressure p1 which is received by the brake-pressure main-valve unit 10 which, on the basis of the first control pressure, outputs the brake pressure pB at the brake-pressure port 4.

As a further component, according to the invention a trailer protection valve 12 is provided which is switched pneumatically. In order to switch the trailer protection valve 12 pneumatically, the latter exhibits a protection-valve control port 12.3 which is connected to the trailer operating-pressure port 6 and consequently receives the trailer operating pressure pA. In the first switching position shown in FIG. 1, the trailer protection valve 12 has been closed and a first trailer protection-valve port 12.1 and a second trailer protection-valve port 12.2 have been isolated. As soon as the trailer operating pressure pA exceeds a predetermined first threshold value, the trailer protection valve 12 switches into the second switching position, not shown in FIG. 1, in which the first and second trailer protection-valve ports 12.1 and 12.2 have been connected. The first trailer protection-valve port 12.1 is connected to a first redundancy-pressure line 13 which, in turn, is connected to a redundancy port 14. A pneumatic port of a brake valuator can, for instance, be coupled to the redundancy port 14, in order to output a redundancy pressure pR manually. In certain embodiments, a brake pressure of a further axle, for instance a front axle VA, can also be coupled to the redundancy port 14, in order in this way to brake the trailer 203 redundantly.

The second trailer protection-valve port 12.2 is connected to a second redundancy-pressure line 15, into which in the case of an open trailer protection valve 12—that is to say, in the second switching position, not shown—the redundancy pressure pR is capable of being output as second control pressure p2. Via the second redundancy-pressure line 15, the redundancy pressure pR or second control pressure p2 is made available at the brake-pressure main-valve unit 10, circumventing the brake-pressure pilot-control unit 8.

More precisely, the second redundancy-pressure line 15 is connected to a redundancy valve 16 which here takes the form of a 2/2-way valve and exhibits a first redundancy-valve port 16.1 and a second redundancy-valve port 16.2. The first redundancy-valve port 16.1 is connected to the second redundancy-pressure line 15 and receives the redundancy pressure pR or the second control pressure p2. The second redundancy-valve port 16.2 is connected to the brake-pressure main-valve unit 10 and makes the second control pressure p2 or redundancy pressure pR available at said main-valve unit.

The redundancy valve 16 is closed in the normal mode—that is to say, in the second switching position, not shown in FIG. 1. Only in the redundancy mode—for instance, if a fault occurs in an electronic control unit ECU—is said valve switched to be currentless, when it falls into the open switching position shown in FIG. 1. The trailer protection valve 12 here inserts a further protection level and frees the redundancy port 14 only when a trailer has been attached—that is to say, trailer operating pressure pA is being made available. Otherwise, if no trailer operating pressure pA is being made available, the trailer protection valve 12 blocks the redundancy port 14, so that the redundancy pressure pR is not bled into the environment if no trailer 203 has been attached. By this means, the air consumption of the braking system 206 can be influenced in positive manner.

The brake-pressure pilot-control unit 8 exhibits an inlet valve 18 and an outlet valve 19. The inlet valve 18 and the outlet valve 19 each take the form of a 2/2-way valve. The inlet valve 18 exhibits a first inlet-valve port 18.1 which is connected to the storage port 2 and receives the storage pressure pV. The second inlet-valve port 18.2 is connected to a first control line 50 and outputs the first control pressure p1 into said line. For the purpose of switching the inlet valve 18 from the first, closed switching position shown in FIG. 1 into the second, open switching position, not shown in FIG. 1, the electronic control unit ECU makes a first switching signal S1 available. In order to bleed the first control line 50, the outlet valve 19 is provided. The outlet valve 19 also takes the form of a 2/2-way valve and exhibits a first outlet-valve port 19.1 and also a second outlet-valve port 19.2. The first outlet-valve port 19.1 is connected to the first control line 50, and the second outlet-valve port 19.2 is connected to a bleeding device 5. In order to bring the outlet valve 19 from the first, closed switching position shown in FIG. 1 into the second, open switching position, not shown in FIG. 1, the electronic control unit ECU makes a second switching signal S2 available.

The brake-pressure main-valve unit 10 exhibits a relay valve 11 taking the form of a main valve. The relay valve 11 serves to amplify the first control pressure p1 in volume and, where appropriate, also the second control pressure p2 or redundancy pressure pR, and to make it available at the brake-pressure port 4 as brake pressure pB. For this purpose, the relay valve 11 exhibits a relay-valve storage port 11.1, a relay-valve working port 11.2, a relay-valve bleeding port 11.3 and a relay-valve control port 11.4. The relay-valve storage port 11.1 is connected to the storage port 2 and receives the storage pressure pV. The relay-valve working port 11.2 is connected to a brake-pressure line 52 which, in turn, is connected to the brake-pressure port 4. The relay-valve bleeding port 11.3 is connected to the bleeding device 5, and the relay-valve control port 11.4 is connected to the first control line 50, in order to receive the first control pressure p1.

The redundancy valve 16 is connected by its second redundancy-valve port 16.2 to a third redundancy-pressure line 53 which discharges into the first control line 50 and in this way can also make the second control pressure p2 or redundancy pressure pR available at the relay-valve control port 11.4. The redundancy valve 16 is open in currentless manner in the first switching position shown in FIG. 1. In the normal mode of the vehicle 200, the redundancy valve 16 is closed and, in order to obtain this, a third switching signal S3 is made available by the electronic control unit ECU.

If it is now to be tested whether a trailer 203 has been attached, by means of the brake-pressure pilot-control unit 8—more precisely, by means of the inlet valve 18—an impulse of the first control pressure p1 can be output at the brake-pressure main-valve unit 10, as a result of which an impulse of the brake pressure pB is output at the brake-pressure port 4. A first measuring line 54, which is connected to a brake-pressure sensor 30, branches off from the brake-pressure line 52. The brake-pressure sensor 30 registers the brake pressure pB output at the brake-pressure port 4 and makes a corresponding brake-pressure signal SpB available at the electronic control unit ECU which then, for instance via a vehicle bus or direct cabling, can make this brake-pressure signal SpB available to a higher-ranking unit, for instance a central module or a unit for autonomous driving. If the brake-pressure sensor 30 registers that the brake pressure pB exceeds a predetermined second threshold value, it is possible to detect that a trailer 203 has been attached. For this purpose, according to the exemplary embodiment shown in FIG. 1 it is not necessary that the trailer protection valve 12 switches, since the latter has not been incorporated into a path between the brake-pressure main-valve unit 10 and the brake-pressure port 4 but is connected upstream of the brake-pressure pilot-control unit 8, parallel to the inlet valve 18.

In a second exemplary embodiment (FIG. 2) of the electropneumatic trailer control-valve unit 1 the redundancy valve 16 and the trailer protection valve 12 have been integrated into a joint valve, namely into a combined valve 17. The further elements have been designed in this second exemplary embodiment (FIG. 2) in accordance with the first exemplary embodiment (FIG. 1) and will not be elucidated in any further detail in the following. Instead of this, reference is made to the above description.

Inasmuch as the two valves—the trailer protection valve 12 and the redundancy valve 16—have been integrated, the second redundancy-pressure line 15 is also dispensed with. Instead of this, the combined valve 17 has a first combined-valve port 17.1, the first combined-valve port 17.1 being connected to the redundancy port 14 or to the first redundancy-pressure line 13, and the second combined-valve port 17.2 being connected to the second control line 53.

Figure 2:
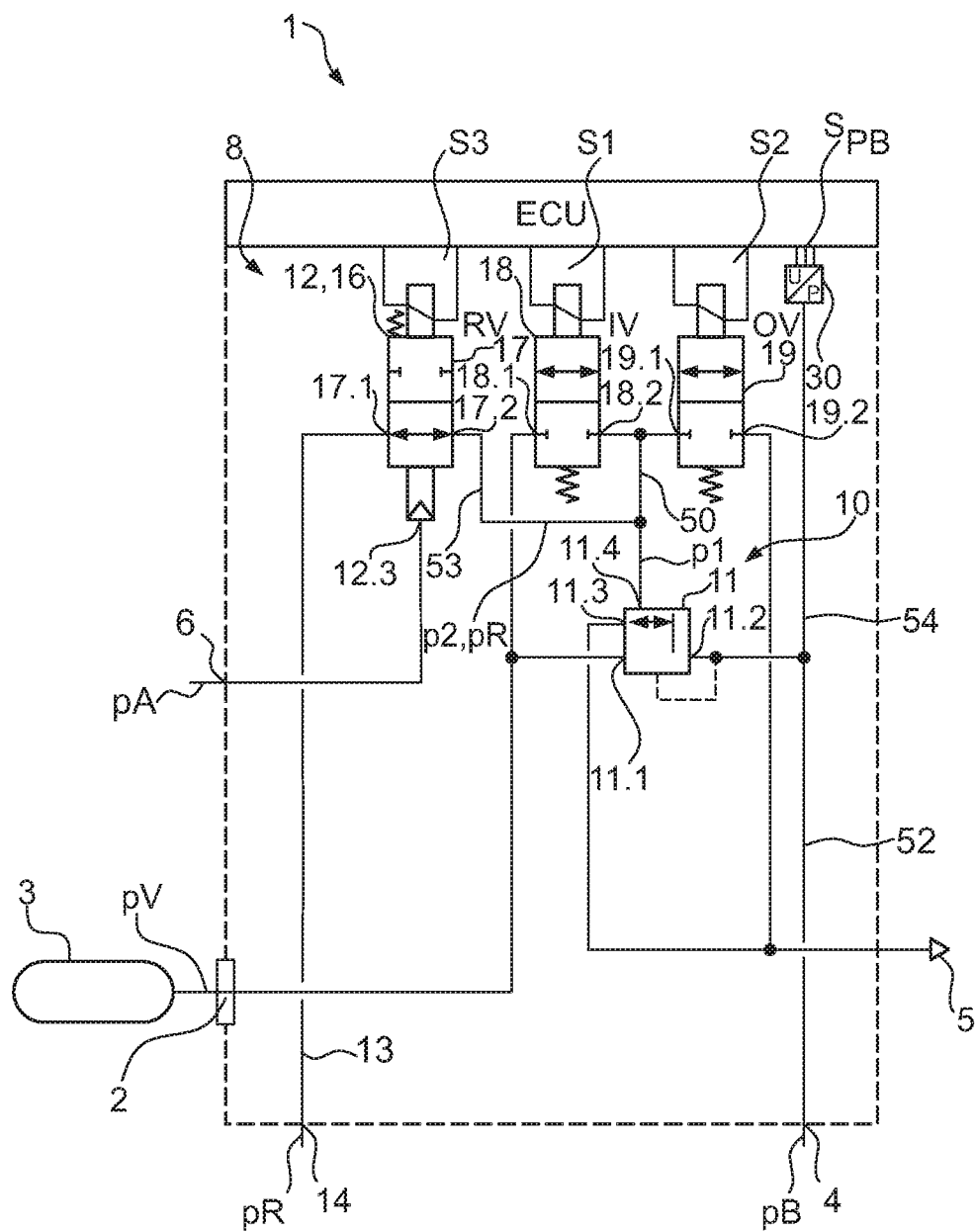
FIG. 2 illustrates a second exemplary embodiment of an electropneumatic trailer control-valve unit.

In this variant, the first threshold value is such that in the case of a passive magnet—that is to say, in a currentless position of the combined valve 17—as from a certain trailer operating pressure pA (for example, 50% of the storage pressure pV) the combined valve 17 is brought into the switching position shown in FIG. 2. So long as this threshold value has not been attained, and/or in the case of an active magnet, the combined valve 17 is in the switching position not shown in FIG. 2.

In this way, a saving of one 2/2-way valve can be made overall, as a result of which the construction space has been reduced. The functionality does not change any further.

The electropneumatic trailer control-valve unit 1 according to one of the first two exemplary embodiments is preferentially part of an electropneumatic trailer control module 100 (cf. FIGS. 3 to 6), several exemplary embodiments of which will be described in the following. In a first exemplary embodiment of an electropneumatic trailer control module 100 (FIG. 3), the electropneumatic trailer control-valve unit 1 according to the first exemplary embodiment (FIG. 1) is provided. The appropriate part in FIG. 3 has been headed "Trailer Control (NA)". The individual elements have once again been denoted by the same reference symbols as in FIG. 1, so reference is made to the description, in its full scope, relating to FIG. 1.

Figure 3:
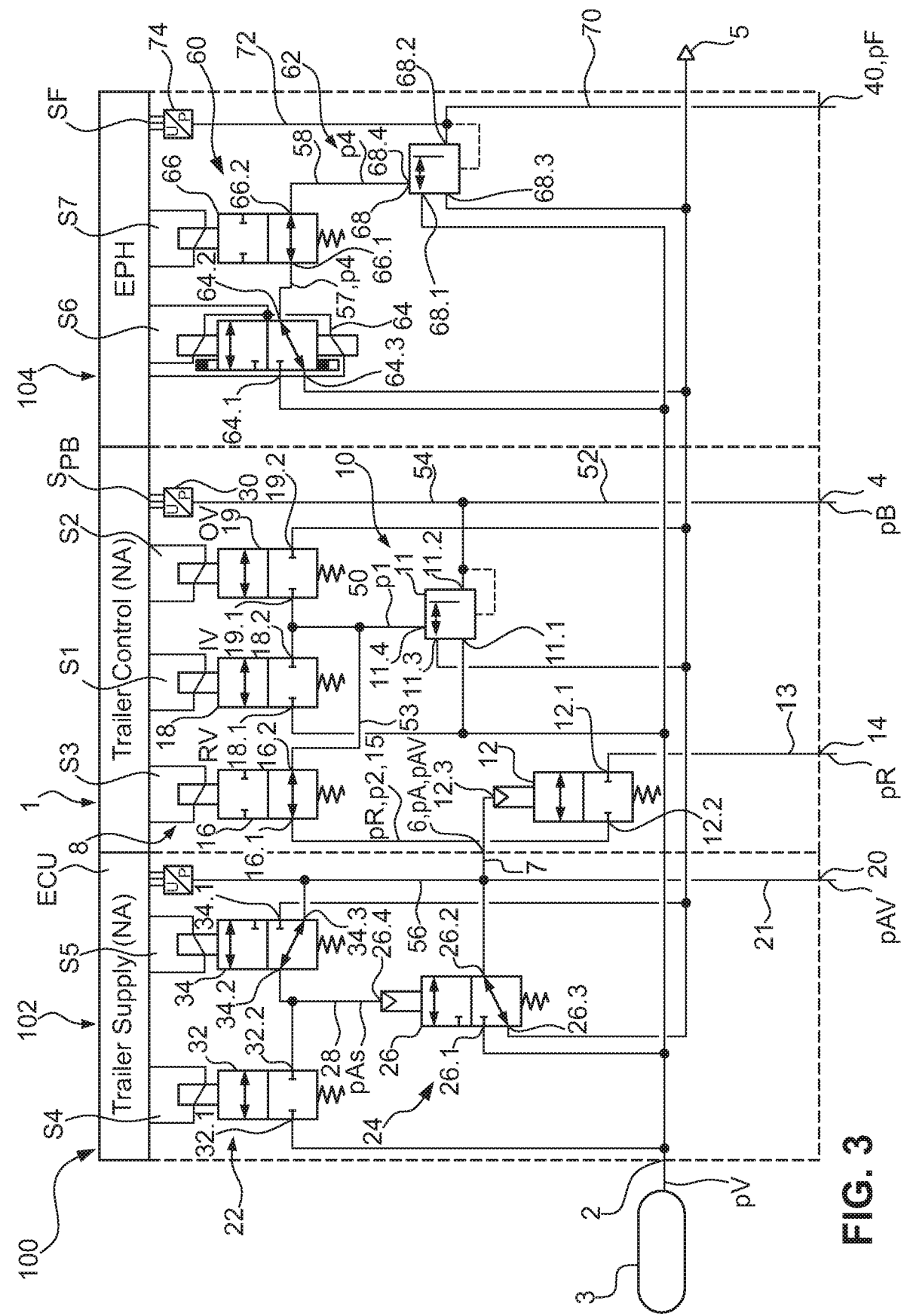
FIG. 3 illustrates a first exemplary embodiment of an electropneumatic trailer control module.

As is evident from FIG. 3, the electropneumatic trailer control module 100 exhibits a trailer supply unit 102, headed "Trailer Supply (NA)", and in this exemplary embodiment also a parking-brake unit 104, headed "EPH". It is to be understood that the parking-brake unit 104 is only optional, but there are certain advantages in integrating said unit into the electropneumatic trailer control module 100.

Whereas the electropneumatic trailer control-valve unit 1 has been provided for the purpose of outputting the brake pressure pB for the trailer 203—that is to say, the control pressure—the trailer supply unit 102 serves to output a trailer supply pressure pAV at a trailer supply-pressure port 20. The trailer supply-pressure port 20 is also designated as "red coupling head". The trailer supply pressure pAV is to be maintained permanently during automotive operation and, as a rule, is switched on or made available after a trailer has been attached.

In order to realize this, the trailer supply unit 102 exhibits a supply pilot-control unit 22 and a supply main-valve unit 24. The supply pilot-control unit 22 exhibits a pilot valve 32 and a holding valve 34. The pilot valve 32 takes the form of an inlet valve and exhibits a first pilot-valve port 32.1 and a second pilot-valve port 32.2. The first pilot-valve port 32.1 is connected to the storage port 2 and consequently receives the storage pressure pV. The second pilot-valve port 32.2 is connected via a supply-pressure control line 28 to the supply main-valve unit 24, more precisely to a pneumatic control port 26.4 of a supply main valve 26 which will be described. The pilot valve 32 can be switched by the electronic control unit ECU, by reason of a fourth switching signal S4, from the closed switching position shown in FIG. 3 into the open switching position not shown in FIG. 3, so that as a consequence of the output of the fourth switching signal S4 the supply control pressure pAS in the supply control-pressure line 28 is output. As soon as said control pressure exceeds a second predetermined threshold value, the supply main valve 26 switches from the first switching position shown in FIG. 3 into the second switching position, not shown in FIG. 3. The supply main valve 26 takes the form of a pneumatically switchable 3/2-way valve and exhibits, besides the pneumatic control port 26.4, a first supply main-valve port 26.1, a second supply main-valve port 26.2 and a third supply main-valve port 26.3. The first supply main-valve port 26.1 is connected to the storage port 2, the second supply main-valve port 26.2 is connected to the trailer supply-pressure line 21, and the third supply main-valve port 26.3 is connected to the bleeding device 5. In the first switching position shown in FIG. 3, the second supply main-valve port 26.2 is connected to the third supply main-valve port 26.3, so that the trailer supply-pressure line 21 and, in consequence, the trailer supply-pressure port 20 are bled. As soon as the supply main valve 26 switches into the second switching position, not shown in FIG. 3, the first supply main-valve port 26.1 is connected to the second supply main-valve port 26.2, so that the storage pressure pV is transmitted through the supply main valve 26 and is made available as trailer supply pressure pAV at the trailer supply-pressure port 20.

The holding valve 34 here takes the form of an electromagnetically switchable 3/2-way valve and exhibits a first holding-valve port 34.1, a second holding-valve port 34.2 and a third holding-valve port 34.3. The first holding-valve port 34.1 is connected to the bleeding device 5. The second holding-valve port 34.2 is connected to the supply control-pressure line 28, and the third holding-valve port 34.3 is connected to a third control line 56 which branches off from the trailer supply-pressure line 21. The holding valve 34 is currentless in the first switching position shown in FIG. 3. By virtue of provision of a fifth switching signal S5, the holding valve 34 can be brought into the second switching position, not shown in FIG. 3. Whereas in the first switching position the second and third holding-valve ports 34.2, 34.3 are connected to one another, in the second switching position the first and second holding-valve ports 34.1, 34.2 are connected to one another. So as soon as the trailer supply pressure pAV is output at the trailer supply-pressure port 20 by means of the supply main valve 26, the trailer supply pressure pAV is recirculated via the third control line 56, the third holding-valve port 34.3, the second holding-valve port 34.2 and the supply control-pressure line 28 and is made available once again at the pneumatic control port 26.4, so that the supply main valve 26 is maintained in the second switching position, not shown in FIG. 3. By this means, a self-locking is realized. In order then to deactivate the trailer supply pressure pAV prior to the uncoupling of the trailer 203, the holding valve 34 has to be brought into the second switching position, not shown in FIG. 3, by means of the fifth switching signal S5, so that the pneumatic control port 26.4 is bled, in order to allow the supply main valve 26 to fall back into the first switching position shown in FIG. 3, and in this way to bleed the trailer supply-pressure port 20.

In this exemplary embodiment, the trailer operating-pressure port 6 is connected to the trailer supply-pressure line 21, where appropriate with interposition of a trailer operating-pressure line 7. In this exemplary embodiment, the trailer operating-pressure line 7 branches off directly from the trailer supply-pressure line 21 and connects the latter to the protection-valve control port 12.3. For this reason, the trailer supply pressure pAV is made available as trailer operating pressure pA at the protection-valve control port 12.3. Since the trailer protection valve 12 has not been incorporated into a path between the brake-pressure main-valve unit 10 and the brake-pressure port 4, a particularly rapid switching of the trailer protection valve 12 is not required, so the volumetric pressure of the trailer supply pressure pAV can be utilized.

The parking-brake unit 104 which has optionally been provided may basically have been designed as known in the prior art. In this exemplary embodiment shown in FIG. 3 (and also in the further exemplary embodiments shown in FIGS. 4 to 6), the parking-brake unit 104 exhibits a parking-brake pilot-control unit 60 and a parking-brake main-valve unit 62. The parking-brake pilot-control unit 60 in this exemplary embodiment has been formed from a bistable valve 64 and a shut-off valve 66. The parking-brake main-valve unit 62 in this exemplary embodiment consists of an EPH relay valve 68. The bistable valve 64 takes the form of a 3/2-way bistable valve and exhibits a first bistable-valve port 64.1, a second bistable-valve port 64.2 and a third bistable-valve port 64.3. The first bistable-valve port 64.1 is connected to the storage port 2; the third bistable-valve port 64.3 is connected to the bleeding device 5. The second bistable-valve port 64.2 is connected to a fourth control line 57 which, in turn, is connected to a first shut-off-valve port 66.1. The shut-off valve 66 takes the form of a 2/2-way valve and exhibits a second shut-off-valve port 66.2. The second shut-off-valve port 66.2 is connected to a fifth control line 58 which, in turn, is connected to the parking-brake main-valve unit 62, more precisely to the EPH relay-valve control port 68.4. The EPH relay valve 68 further exhibits an EPH relay-valve storage port 68.1, which is connected to the storage port 2, an EPH relay-valve working port 68.2, which is connected to a parking-brake line 70 which, in turn, is connected to a spring-actuator port 40, and also an EPH relay-valve bleeding port 68.3 which is connected to the bleeding device 5. By switching of the bistable valve 64, a fourth control pressure p4 can be output into the fourth control line 57, subsequently via the open shut-off valve 66 into the fifth control line 58, and made available at the EPH relay-valve control port 68.4. The EPH relay valve 68 then outputs, in an equivalent manner, the spring-actuator pressure pF into the parking-brake pressure line 70. From the parking-brake pressure line 70 a third measuring line 72 branches off which is connected to a parking-brake sensor 74 which makes a parking-brake signal SF available at the electronic control unit ECU. The bistable valve 64 can be switched by a sixth switching signal, and the shut-off valve 66 can be switched by a seventh switching signal, in order, for instance, to block the EPH relay-valve control port 68.4, in order in this way to confine the spring-actuator pressure pF.

The second exemplary embodiment (FIG. 4) of the electropneumatic trailer control module 100 is based on the first exemplary embodiment (FIG. 3), and identical elements have been provided with identical reference symbols. In the following, in particular the differences from the first exemplary embodiment of the electropneumatic trailer control module 100 according to FIG. 3 will be emphasized.

Figure 4:
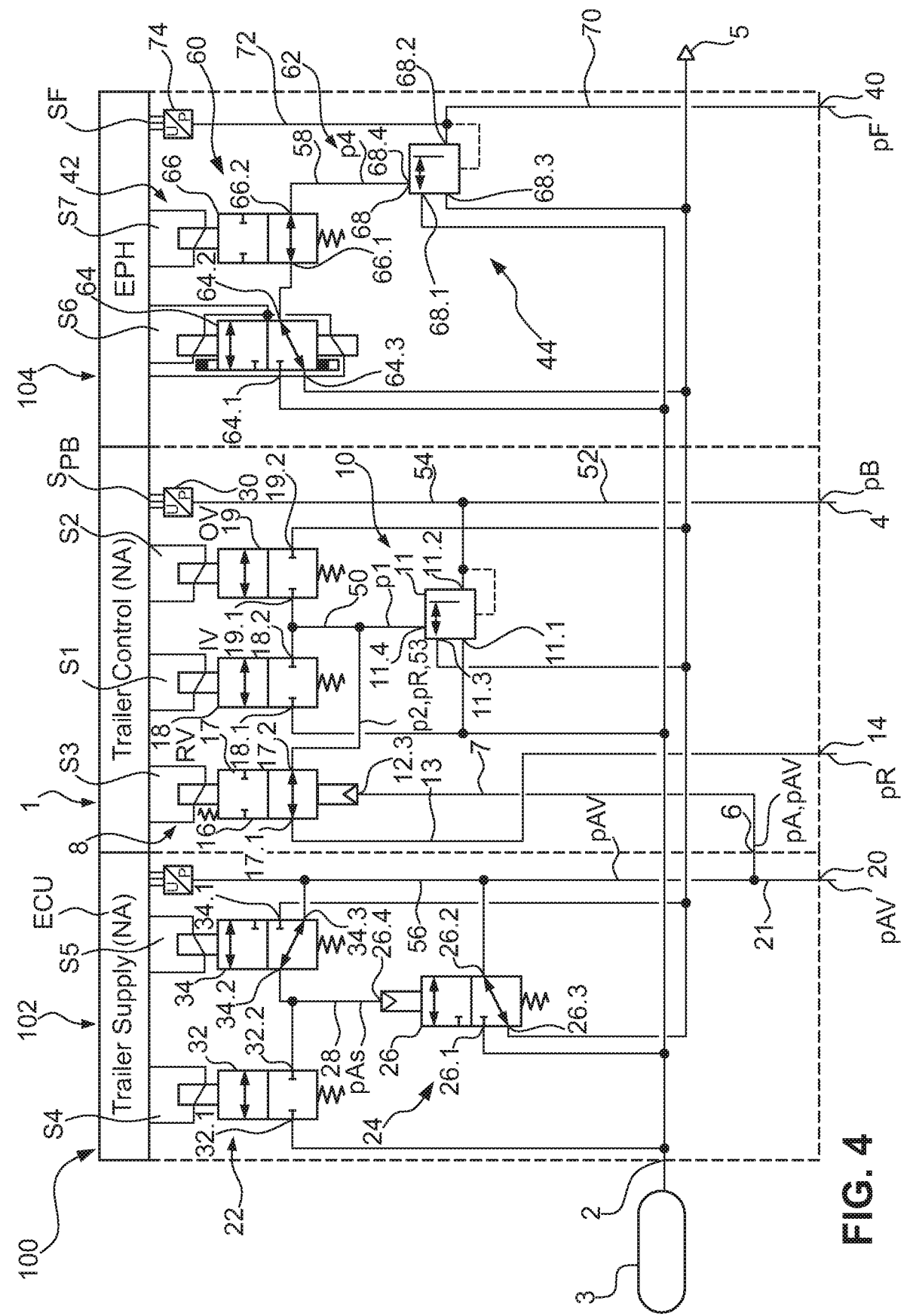
FIG. 4 illustrates a second exemplary embodiment of an electropneumatic trailer control module.
Figure 5:
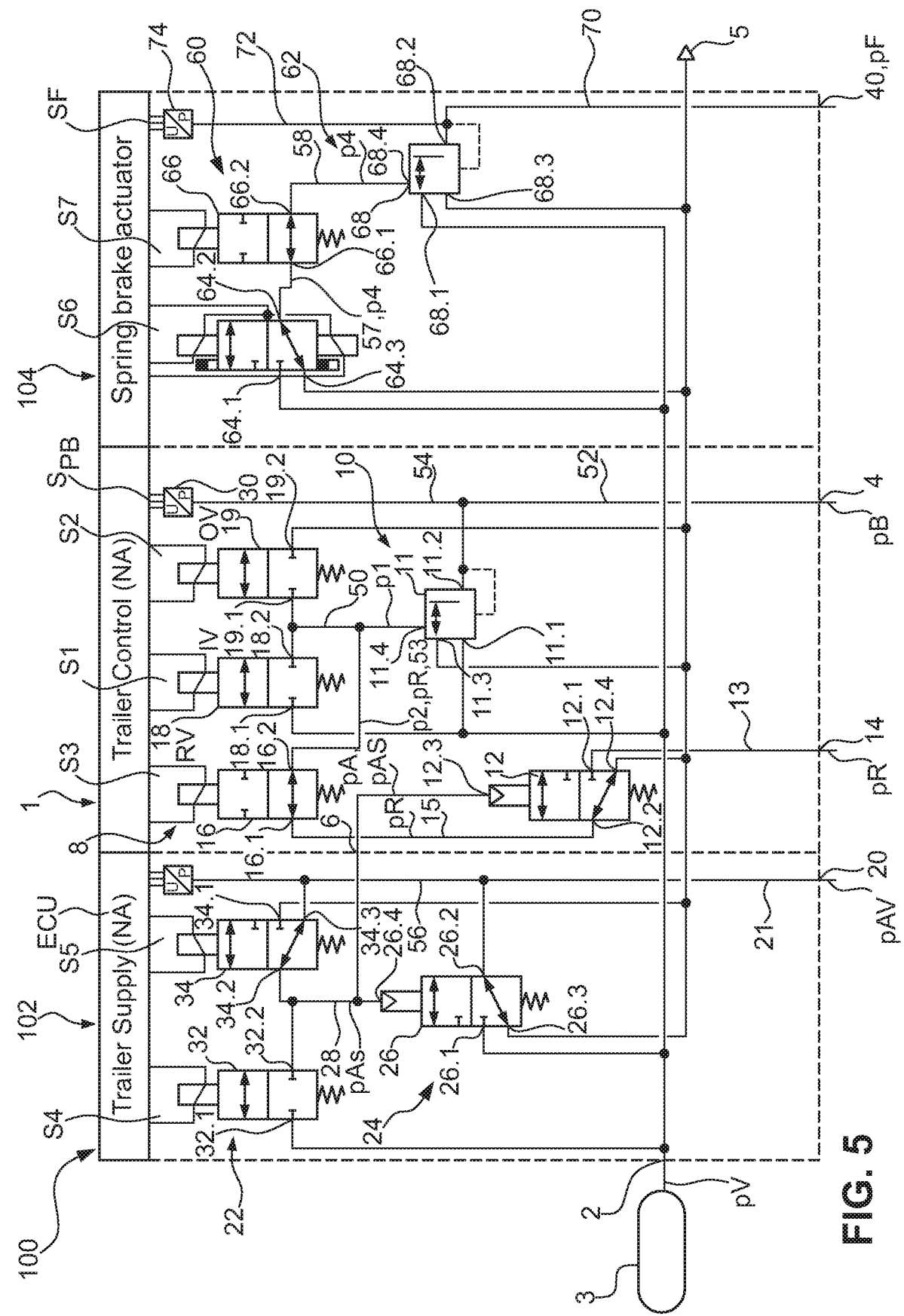
FIG. 5 illustrates a third exemplary embodiment of an electropneumatic trailer control module.

In contrast to the first exemplary embodiment, the electropneumatic trailer control-valve unit 1 that comes into operation in this second exemplary embodiment of the electropneumatic trailer control module 100 is based on the second exemplary embodiment of the electropneumatic trailer control-valve unit 1 according to FIG. 2 described above. To this extent, firstly the trailer protection valve 12 and the redundancy valve 16 have been integrated within a combined valve 17. The trailer operating-pressure port 6 is connected once again to the trailer supply-pressure line 21, once again with interposition of the trailer operating-pressure line 7. To this extent, also in this exemplary embodiment the trailer supply pressure pAV is made available as trailer operating pressure pA to the protection-valve control port 12.3. There are no further differences between the first and second exemplary embodiments (FIGS. 3 and 4).

The third exemplary embodiment (FIG. 5) of the electropneumatic trailer control module 100 is based on the second exemplary embodiment (FIG. 4) of the electropneumatic trailer control module 100. The trailer protection valve 12 and the redundancy valve 16 have not been integrated but take the form of separate valves. But a first difference from the second exemplary embodiment consists in the fact that the trailer protection valve 12 takes the form of a 3/2-way valve and exhibits a third trailer protection-valve port 12.4. This third trailer protection-valve port 12.4 is optional and in this exemplary embodiment is connected to the bleeding device 5. Said port serves to bleed the second redundancy-pressure line 15 actively via the bleeding device 5, and not only via the redundancy port 14.

A further difference consists in the fact that the trailer operating-pressure port 6 is connected to the supply control line 28 and not to the trailer supply-pressure line 21. That is to say, as trailer operating pressure pA the trailer supply pressure pAV is not made available, but rather the supply control pressure pAS. The speed of reaction of the system can be increased in this way. In conformity with the first and second exemplary embodiments (FIGS. 3, 4), once again a trailer operating-pressure line 7 is used which in this exemplary embodiment branches off directly from the supply control-pressure line 28 and connects the latter to the protection-valve control port 12.3.

Figure 6:
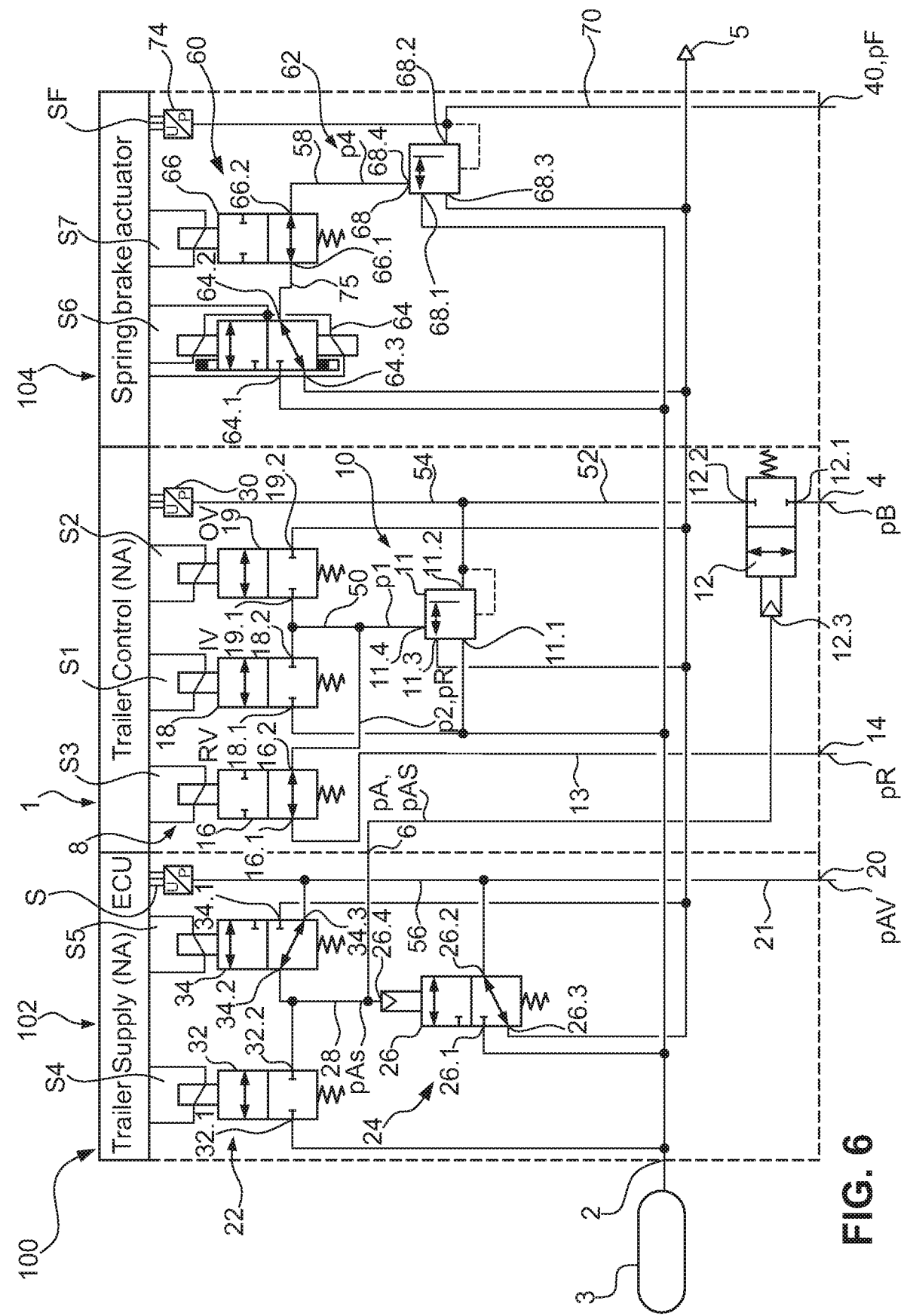
FIG. 6 illustrates a fourth exemplary embodiment of an electropneumatic trailer control module.

The fourth exemplary embodiment (FIG. 6) of the electropneumatic trailer control module 100 differs from the first three exemplary embodiments, in particular, by virtue of the fact that the trailer protection valve 12 has been inserted directly into the brake-pressure line 52. To this extent, the first trailer protection-valve port 12.1 is connected to the brake-pressure port 4, and the second trailer protection-valve port 12.2 is connected to the relay-valve working port 11.1 via the brake-pressure line 52. The trailer protection valve 12 has been biased into the first closed switching position which is shown in FIG. 6, and switches into the second open switching position, not shown in FIG. 6, as soon as the trailer operating pressure pA exceeds the first predetermined threshold value, so that the brake pressure pB can be transmitted through the trailer protection valve 12. Accordingly, in this exemplary embodiment, in the case where no trailer 203 has been attached the trailer protection valve 12 can not only prevent the redundant output of the brake pressure pB but also the output in the normal mode.

As trailer operating pressure pA in this exemplary embodiment, once again the supply control pressure pAS is made available, inasmuch as the protection-valve control port 12.3 is connected to the supply control-pressure line 28 via the trailer operating-pressure line 7. Here, the response-time of the trailer protection valve 12 can accordingly be accelerated, so that the disadvantage that a brake pressure pB can be output only after the switching of the trailer protection valve 12 is at least partly compensated.

The redundancy valve 16 is consequently not connected to the trailer protection valve 12; rather, the first redundancy-valve port 16.1 is directly connected to the first redundancy-pressure line 13 which is connected to the redundancy port 14.

Figure 7:
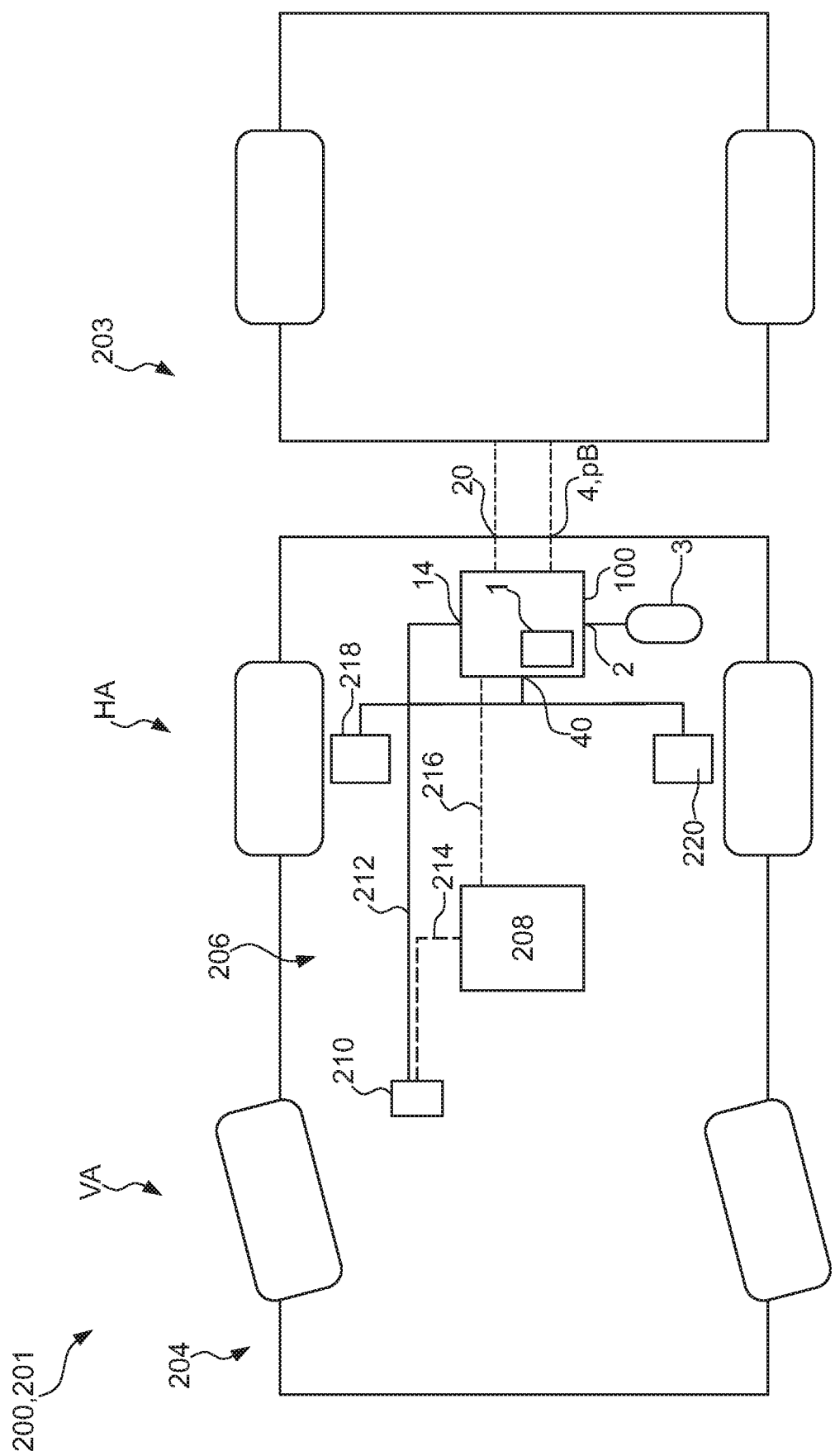
FIG. 7 illustrates a schematic view of a utility vehicle.

FIG. 7 now illustrates a vehicle 200, in particular a utility vehicle 201 with a towing car 204 and a trailer 203. The towing car 204 exhibits an electronically controllable pneumatic braking system 206. The braking system 206 is provided with a central module 208 and also with a brake valuator 210. The brake valuator 210 exhibits a pneumatic output which via a pneumatic line 212 is connected to a redundancy port 14 of an electropneumatic trailer control module 100 which may have been designed in accordance with one of the preferred embodiments described above. The brake valuator 210 also includes an electrical output which is connected to the central module 208 via an electrical line 214. The central module 208 is once again connected to the electropneumatic trailer control module 100 via a bus 216, in order to make signals available to said module.

The spring-actuator port 40 is coupled to the rear axle HA of the towing car 204 by first and second spring actuators 218, 220.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electropneumatic trailer control-valve unit for a vehicle, the electropneumatic trailer control-valve unit comprising:
    a storage port for coupling a store of compressed air for a trailer;
    a brake-pressure port;
    a brake-pressure pilot-control unit configured to output at least one first control pressure;
    a brake-pressure main-valve unit configured to receive the first control pressure and to output a brake pressure at a brake-pressure port;
    a trailer operating-pressure port configured to receive a trailer operating pressure;
    a pneumatically switched trailer protection valve with a protection-valve control port which is connected to the trailer operating-pressure port for receiving the trailer operating pressure; and
    a redundancy port at which a redundancy pressure is capable of being output and which is connected to the trailer protection valve in such a manner that in a second switching position of the trailer protection valve, the redundancy pressure capable of being transmitted to the brake pressure main valve unit,
    wherein the trailer protection valve switches from a first switching position into the second switching position if the trailer operating pressure exceeds a predetermined first threshold value.

2. An electropneumatic trailer control module for a vehicle, the electropneumatic trailer control module comprising:
    a trailer supply unit, including a trailer supply-pressure port and a supply pilot-control unit; and
    a supply main-valve unit;
    an electropneumatic trailer control-valve unit connected to the trailer supply unit as claimed in claim 1,
    wherein the trailer supply unit is configured to output the trailer operating pressure at the trailer operating-pressure port.

3. The electropneumatic trailer control module as claimed in claim 2, wherein the supply pilot-control unit has been designed to output a supply control pressure at the supply main-valve unit, and
wherein the supply main-valve unit has been designed to output a trailer supply pressure at the trailer supply-pressure port based on the reception of a third control pressure.

4. The electropneumatic trailer control module as claimed in claim 3, wherein the trailer supply unit outputs the supply control pressure or the trailer supply pressure as trailer operating pressure at the trailer operating-pressure port.

5. The electropneumatic trailer control module as claimed in claim 2, wherein the supply main-valve unit comprises a pneumatically controllable supply main valve with a pneumatic control port which is connected to the supply pilot-control unit via a supply control-pressure line, wherein the trailer operating-pressure port is connected to the supply control-pressure line.

6. The electropneumatic trailer control module as claimed in claim 2, wherein the supply main-valve unit is connected to the trailer supply-pressure port via a trailer supply-pressure line, wherein the trailer operating-pressure port is connected to the trailer supply-pressure line.

7. The electropneumatic trailer control module as claimed in claim 2, further comprising:
a parking-brake unit including a spring-actuator port a parking-brake pilot-control unit, and a parking-brake main-valve unit configured to output a spring-actuator pressure at the spring-actuator port.

8. The electropneumatic trailer control module as claimed in claim 2, further comprising an electronic control unit (ECU) configured to control the brake-pressure pilot-control unit.

9. A utility vehicle with an electronically controllable pneumatic braking system with an electropneumatic trailer control module as claimed in claim 2.

10. The electropneumatic trailer control-valve unit as claimed in claim 1, wherein the trailer protection valve is configured to, in the second switching position, permit the output of the brake pressure.

11. The electropneumatic trailer control-valve unit as claimed in claim 10, wherein the trailer protection valve is configured to, in the second switching position, permit a direct output of the brake pressure or an output of a second control pressure at the brake-pressure main-valve unit for the purpose of inducing an output of the brake pressure.

12. The electropneumatic trailer control-valve unit as claimed in claim 1, wherein the brake-pressure pilot-control unit comprises an electromagnetically switchable redundancy valve, and wherein the trailer protection valve is connected to the redundancy valve.

13. The electropneumatic trailer control-valve unit as claimed in claim 12, wherein the trailer protection valve and the redundancy valve have been integrated into a joint combined valve.

14. A utility vehicle with an electronically controllable pneumatic braking system with an electropneumatic trailer control-valve unit as claimed in claim 1.

15. The electropneumatic trailer control-valve unit as claimed in claim 1, comprising a brake-pressure sensor for registering the brake pressure.

16. A method for controlling an electropneumatic trailer control-valve unit, the method comprising:
receiving a trailer operating pressure at a protection-valve control port of a trailer protection valve;
providing a redundancy port at which a redundancy pressure is capable of being output; and
switching the trailer protection valve from a first switching position into a second switching position, wherein in the second switching position the redundancy pressure is capable of being transmitted to a brake pressure main valve unit.

17. The method as claimed in claim 16, wherein the trailer operating pressure is a supply control pressure output by a supply pilot-control unit.

18. The method as claimed in claim 16, wherein a brake pressure is capable of being output irrespective of a position of the trailer protection valve.

19. The method as claimed in claim 16, further comprising:
registering the pressure at the brake-pressure port; and
ascertaining that a trailer has been attached to the brake-pressure port.

* * * * *